United States Patent
Muirhead

[19]
[11] Patent Number: 5,878,488
[45] Date of Patent: Mar. 9, 1999

[54] WASHERLESS BOLT HEAD SEAL FOR COMPRESSOR HOUSING

[75] Inventor: Hugh James Muirhead, Lockport, N.Y.

[73] Assignee: General Motors Corporation, Detroit, Mich.

[21] Appl. No.: 707,676

[22] Filed: Sep. 4, 1996

[51] Int. Cl.$^6$ .............................. B23P 11/00; F16B 33/00
[52] U.S. Cl. .................... 29/890.035; 29/407.1; 29/525.11; 411/369; 411/370; 411/181
[58] Field of Search .................. 29/890.035, 407.05, 29/407.1, 515, 520, 525.11; 411/369, 370, 176, 181

[56] References Cited

U.S. PATENT DOCUMENTS

| | | | |
|---|---|---|---|
| 3,571,903 | 3/1971 | Persson | 29/520 |
| 4,304,039 | 12/1981 | Asmus | 29/525.11 |
| 4,966,512 | 10/1990 | Takaku | 411/181 |
| 5,141,375 | 8/1992 | Pollizzi | 411/369 |
| 5,230,137 | 7/1993 | Abe | 29/407.1 |
| 5,256,019 | 10/1993 | Phillips, II | 29/525.11 |

*Primary Examiner*—Paul T. Sewell
*Assistant Examiner*—Jila Mohandesi
*Attorney, Agent, or Firm*—Patrick M. Griffin

[57] ABSTRACT

A compressor housing is sealed around the bolt head without the use of an intervening sealing washer. Instead, the bolt hole is machined through the compressor housing in such a way as to assure that the sharp circular edge of the bolt hole always has a degree of radial overlap with the rounded corner that makes the transition from the body of the bolt to the flat undersurface of the bolt. Then, when the bolt is tightened, it is assured that the sharp corner of the bolt hole will be hit and be rounded over by the rounded corner of the bolt head into a closely matching configuration. This assures good, close contact and a tight gas seal. It also allows for over tightening the bolt head, because the ideal sealing pressure will still be attained at some point moving radially inwardly along the interface between bolt head round corner and the deformed bolt hole edge.

3 Claims, 3 Drawing Sheets

WASHERLESS BOLT HEAD SEAL FOR COMPRESSOR HOUSING

TECHNICAL FIELD

This invention relates to automotive air condition compressor housings in general, and specifically to such a housing in which a gas tight seal between the undersurface of a bolt head and a bolt hole through the housing is achieved by direct contact, with no intervening seal washer.

BACKGROUND OF THE INVENTION

Automotive air conditioning compressor housings are typically multi piece canisters which must maintain a gas tight, pressurized interior against leakage. A cylindrical body is closed by at least one end cap, and several elongated bolts hold the end cap in place. A closed or "blind" threaded hole receives the threaded end of the bolt, which need not be sealed. The head of the bolt covers an exterior opening through the housing, and must be sealed gas tight. The conventional sealing system is portrayed in the first four Figures of the drawings, in which:

FIG. 1 is a cross section of a compressor housing;

FIG. 2 is an enlargement of the exterior opening of a bolt hole with the bolt head and a sealing washer pulled axially away from the sealed position;

FIG. 3 is a view like FIG. 2, but showing the bolt head and sealing washer in place;

FIG. 4 is an enlarged view looking down into the bolt hole after the bolt and washer have been removed.

Referring first to FIGS. 1 and 2, a typical compressor housing, indicated generally at 10, consists of multiple parts closed by an end cap 12. The cap 12 and other parts are held together by several bolts, one of which is indicated generally at 14. The housing parts, including the end cap 12, are usually made of cast aluminum alloy, for weight reduction and ease of manufacture. The bolts 14 are steel, for strength. Each bolt passes through a coaxial bolt hole 16 (actually a series of aligned holes) with some radial clearance, to allow for ease of insertion, and is threaded at the end into a blind, closed hole 18 that needs no sealing. At the opposite end, however, the bolt hole 16 opens through a flat, annular sealing surface 20 that is machined down into the outer surface of cap 12, creating a sharp circular edge of equal diameter 22. Sealing surface 20 is machined just to assure a suitable flat surface, since the outer surface of cap 12 may be curved or pebbled. A gas tight seal must somehow be provided continuously around the bolt hole edge 22 to prevent pressure loss from housing 10. Traditionally, a seal has been provided, indirectly, between the sealing surface 20 and a flat, annular undersurface or "pad" 24 of a hexagonal bolt head 26. The bolt head pad 24 stands proud of the bolt head 26 in order to prevent interference with the bolt head 26 and the inset sealing surface 20. The bolt head pad 24 merges into the main cylindrical bolt body 28 across a small rounded "corner" 30, which comprises approximately a quarter circle in cross section. The corner 30 serves no purpose other than the typical avoidance of stress concentration at what would otherwise be a sharp corner, and has no role to play in sealing. Likewise, the bolt hole edge 22 plays no part in sealing. Sealing is entirely a function of the tight capture of an annular sealing washer 32 between the axially opposed bolt head pad 24 and the sealing surface 20, of an annular sealing washer 32.

Referring next to FIGS. 2 through 3, sealing washer 32 has an inner diameter that surrounds the bolt hole edge 22, but is large enough to clear the rounded corner 30, and thereby make contact only with the flat surface of the pad 24. The thickness of the washer 32 prevents the bolt corner 30 from contacting the bolt hole edge 22, or any other part of the sealing surface 20. Therefore, the upper and lower surfaces of the washer 32 make flat to flat contact only between the bolt head pad 24 and the sealing surface 20 respectively. Washer 32 is typically made up of material softer than bolt 12, such as copper or plated copper, and, ideally, also softer than the aluminum material of cap 12. Theoretically, washer 32, if compressed sufficiently, is supposed to yield and fill any voids or irregularities in the surfaces of bolt head pad 24 and end cap sealing surface 20, providing a gas tight seal. In actual practice, washers like 32 have been found to turn with the bolt head 26, rubbing, scratching and galling on the sealing surface 2D. The result of this action can be seen, once the bolt 14 and washer 32 have been removed, as an irregular, shiny circle on the sealing surface 20 surrounding edge 22. Now, so long as this circle covers 360 degree, it is evidence of a complete seal. And, in practice, satisfactory sealing is obtained, on a one time basis, at least, by a very careful control of the pressure with which the bolt 14 is torqued down against washer 32. However, because of the scraping action, and sometimes even deformation of the washer 32, it is difficult to make the seal repeatable. That is, it may be impossible to remove and replace the bolt 14 with the same washer 32. Also, it is always preferable that assembly operations of any sort be less dependent upon holding any parameter, such as torque or pressure, within very close limits.

SUMMARY OF THE INVENTION

The invention provides a method to create an improved, repeatable, and less pressure sensitive seal, and also eliminates the washer completely. This is done by actually incorporating the previously unutilized bolt head rounded corner to create a seal in cooperation with the sharp edge of the bolt hole.

In the embodiment disclosed, the bolt hole (and its sharp edge) is sized, given the expected manufactured tolerances, so as to assure a radial overlap with the bolt head rounded corner. This is done by taking into account the expected tolerances of the bolt hole, bolt body and the rounded corner. These are held so as to assure that even when the sharp bolt hole edge is at its most outboard location, and the rounded corner of the bolt head is at its most inboard location, there is always some radial overlap. Therefore, when the bolt head pad is tightened into intimate, flat to flat contact with the sealing surface, it is thereby assured that there is always some degree of axial interference between the bolt head's rounded corner and the sharp edge of the bolt hole. This, in turn, assures that the sharp edge of the bolt hole is deformed axially downwardly and radially inwardly, continuously and 360 degrees around, into a shape that matches the rounded corner very closely. There is, therefore a complete, intimate contact all the way around the bolt hole between the rounded corner and the sealing surface, giving an adequate seal.

BRIEF DESCRIPTION OF THE DRAWINGS

These and other objects and features of the invention will appear from the following written description, and from the drawings, in which.

DESCRIPTION OF THE PREFERRED EMBODIMENT

Figure 5:
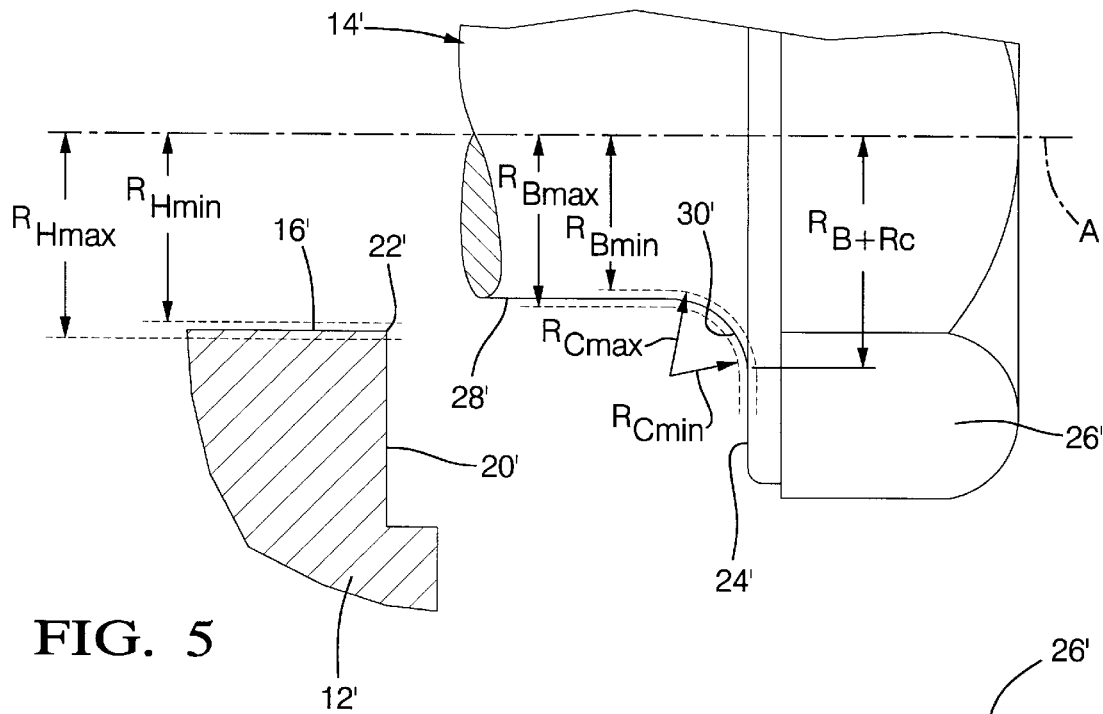
FIG. 5 is an enlarged view of one side of a bolt hole and part of the surrounding sealing surface before installation of the bolt, as well as part of a bolt head and bolt body, shown coaxial to illustrate their dimensional relationship.
Figure 6:
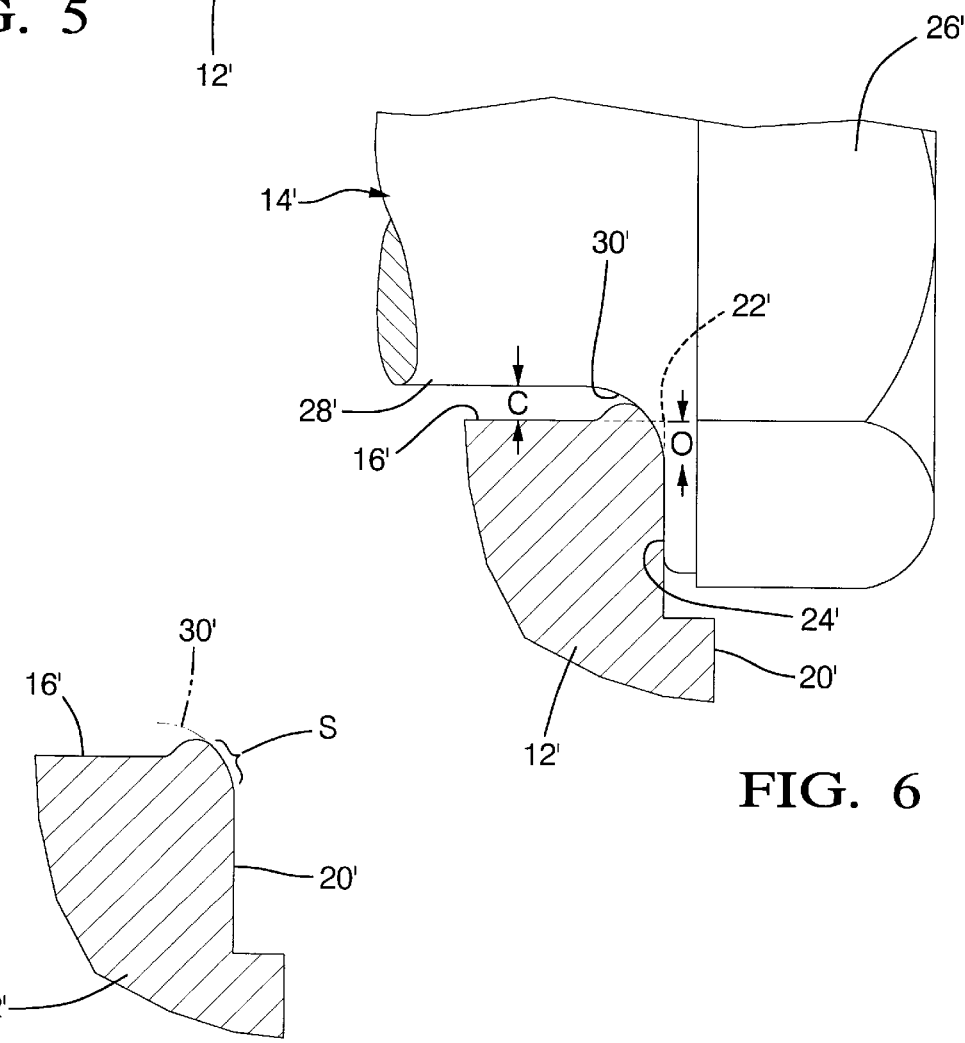
FIG. 6 shows the bolt head installed, while illustrating the undeformed condition of the bolt hole edge in dotted lines.

Referring first to FIGS. 5 and 6, the various surfaces and general shape of the bolt and bolt hole made and used according to the invention are nearly the same as the bolt 14 and bolt hole 16 described above, and are therefore indicated by the same number with a prime ('). In fact, the various features are, qualitatively speaking, identical, differing only quantitatively. Even in the quantitative sense, the dimensions of bolt 14' and bolt hole 16' are significant only by virtue of their dimensional relationship to each other. Those inter relationships can be described in terms of the spread between the minimum and maximum radii of several features that can be expected in the normal course of manufacture. The radii shown are measured from the co axis, indicated at A. Specifically, the radius of the bolt hole 16' (and its sharp circular edge 22') can be expected to vary from a minimum to a maximum indicated at $R_{Hmin}$ and $R_{Hmax}$ respectively. In the embodiment disclosed, the radius spread for the bolt hole 16' is about 7.64 to 7.47 mm. The radius $R_B$ of the cylindrical outer surface of the bolt body 28' varies between a minimum $R_{Bmin}$ and maximum $R_{Bmax}$ of 7.15 and 7.27 mm. Of course, $R_{Hmin}$ must always be greater than $R_{Bmax}$ in order to assure a radial clearance C that allows easy insertion of bolt 14'. That is true for the prior art, as well, but in the method of the invention, the same clearance provides another function as well, described below. The corner radius of the rounded corner 30' (not measured from A) will also vary over a tolerance range $R_{Cmin}$ to $R_{Cmax}$ of 0.40 to 0.50 mm. The rounded corner 30' is essentially a 90 degree or quarter circle in cross section, and, in terms of its location in space, it begins at the cylindrical surface of the bolt body 28' and ends at an imaginary circle where it merges into the flat undersurface of the bold pad 24'. Outboard of that imaginary circle, the undersurface of the bolt head 26' is just flat. That imaginary circle where the rounded corner 30' "ends" will have a radius equal to the radius $R_B$ the bolt body 28' (which will have a value somewhere in its tolerance range) plus the radius $R_C$ of the quarter circular corner 30' (which will also be somewhere within its tolerance range), or $R_B+R_C$ total. The main objective of the invention is to assure for all cases a radial overlap between the bolt hole sharp edge 22' (which has the same diameter as bolt hole 16') and the rounded corner 30'. So, as long as the smallest possible value of $R_B+R_C$ which would be $R_{Bmin}+R_{Cmin}$, is always greater than the largest possible value of $R_H$, or $R_{Hmax}$, then the imaginary circle where rounded corner 30' ends will always be located radially outboard of the bolt hole sharp edge 22'. In other words, some radial overlap, indicated at O, is guaranteed. Here, the smallest value of $R_B+R_C$ is 7.15 plus 0.40, or 7.55 mm, while the maximum radius of the bolt hole edge 22' is 7.64 mm, for a difference (least overlap) of 0.09 mm. The maximum overlap would be 0.30 mm.

Figure 7:
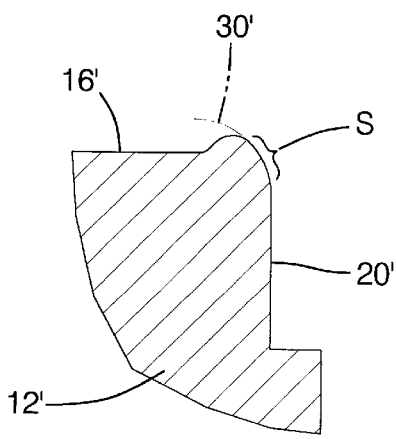
FIG. 7 shows the deformed corner of the bolt hole edge alone, and shows the location of the rounded corner of the bolt head in dotted lines.

Referring next to FIGS. 6 and 7, the purpose for assuring the radial overlap described between the bolt rounded corner 30' and the bolt hole sharp edge 22' is illustrated. The bolt 14' is tightened with no washer intervening, so that pad 24' is torqued down tightly and directly against the sealing surface 20'. Bolt 14' is torqued down so as to achieve more than the minimum sealing pressure between the bolt pad 24' and the sealing surface 22' that would have been used with the prior bolt 14. The minimum torque and sealing pressure would have been determined from the use of bolt 14 in the prior art, and no particular formula therefor can be given. The important point here is that the tightening torque is not so sensitive here, and bolt 14' can be consistently "over tightened", in effect, if desired. There is no washer 32 to deform or gall from any over tightening. Instead, what happens is that the assured radial overlap described causes the rounded corner 30' to axially interfere with the bolt hole edge 22', deforming it axially down and radially inwardly into the clearance C, into the shape shown. The undeformed edge 22' is shown in dotted line FIG. 6 for comparison. The assured metal deformation also assures a close conformance between the bolt rounded corner 30' over a narrow annular sealing area indicated at S, which creates a gas tight seal. Of course, there is still a much greater area of contact between the flat undersurface of the bolt pad 24' and the still flat outer area of the sealing surface 20', which provides as much flat to flat sealing effect as before. As noted, the pressure in the flat to flat area may be deliberately "too high". But, moving radially inwardly over the area S, the pressure between the deformed metal in the area S and the bolt rounded corner 30' continually decreases from that "too high" sealing pressure, eventually going to zero where the surface of the corner 30' diverges and loses contact. The location of the corner 30' is shown in dotted lines to illustrate. Therefore, somewhere over the area S, at some thin annular portion thereof, the "ideal" sealing pressure will inevitably be attained which is another advantage of the method disclosed. Another advantage that has been found, somewhat surprisingly, is that once the sharp edge 22' has been deformed down and into the area S, the bolt 14' can be removed and replaced with as good a seal as it initially had. Apparently, the deformed area "resets" the bolt 14' properly and individually if and when it is removed and replaced.

Figure 1:
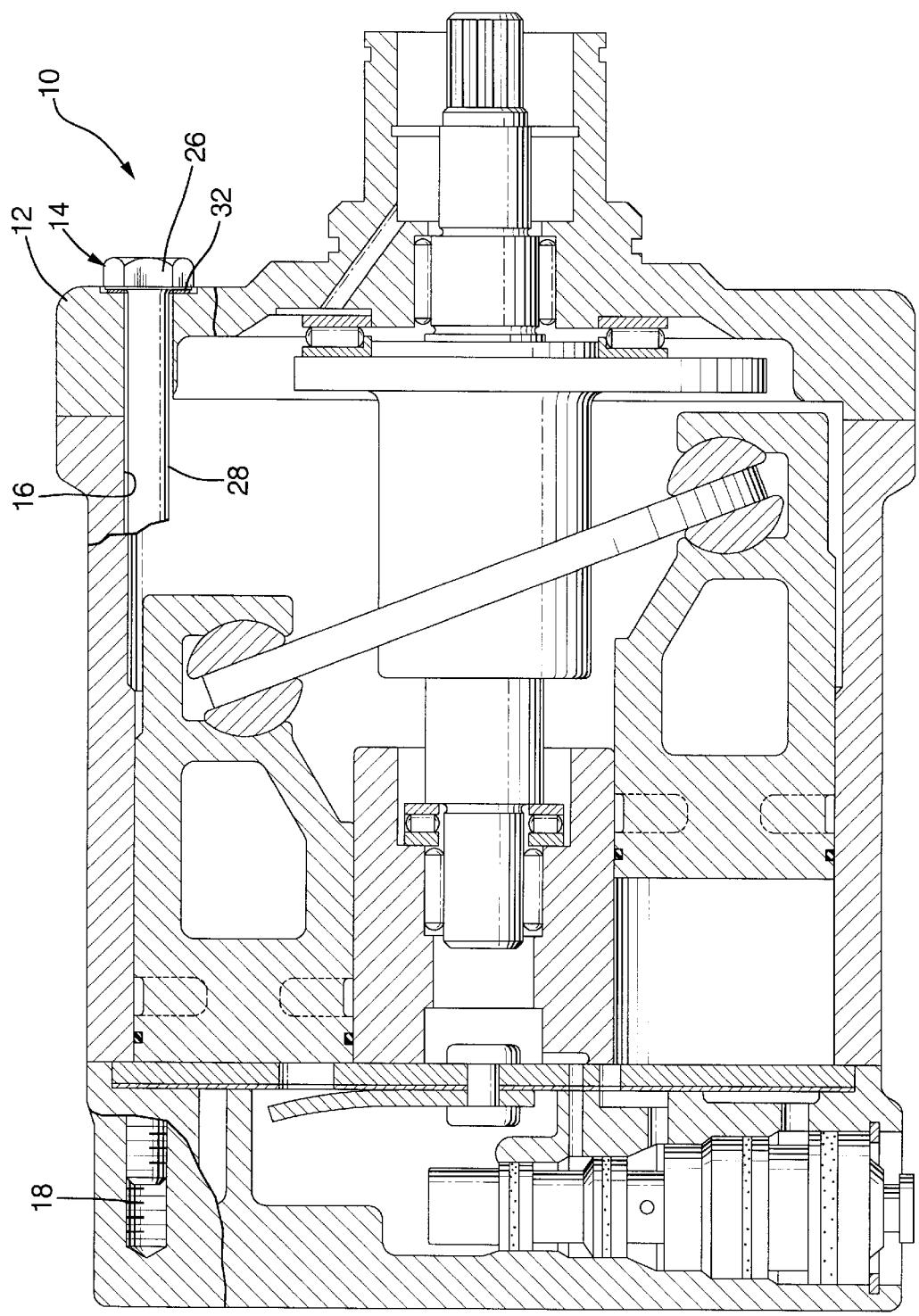
Figure 2:
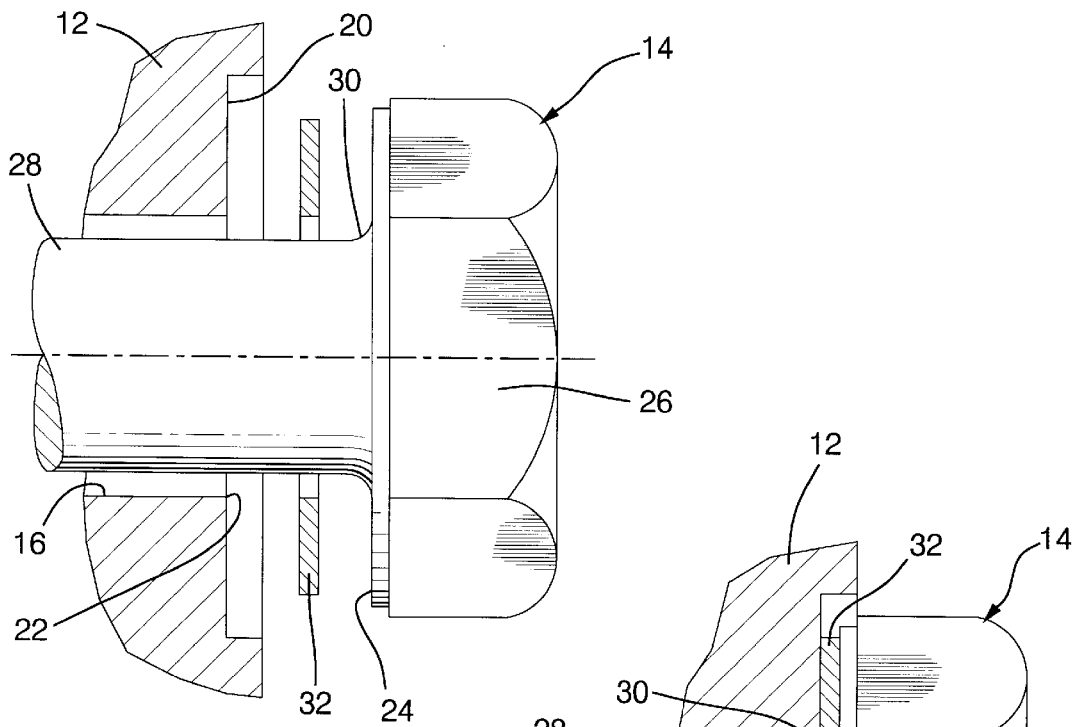
Figure 3:
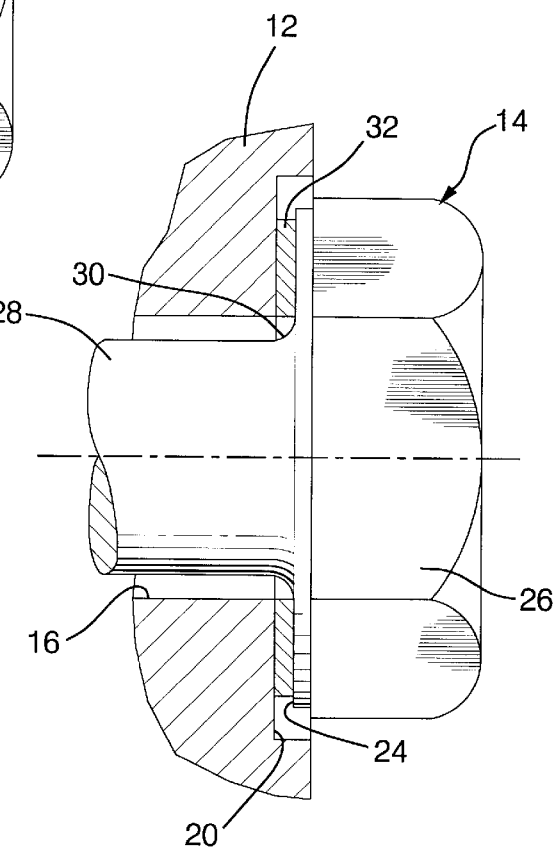
Figure 4:
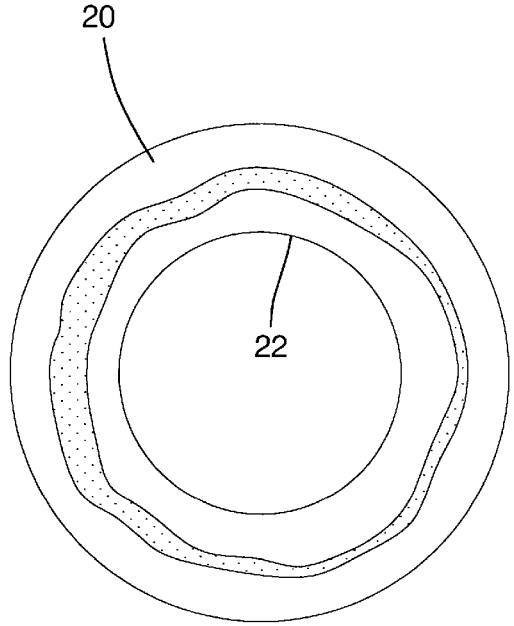

Theoretically, and most fundamentally, a designer incorporating the method described above is providing the bolt 14' with something it did not have before, that is, a rounded corner 30' sized to assure a radial overlap with the sharp hole edge 22'. In fact, that is counter intuitive, as can be seen by referring back to FIG. 3. Had there been such rounded corner to bolt hole edge radial overlap in the prior art, then the flat to flat contact between the bolt pad 24, the sealing surface 20, and the two surfaces of washer 32, would have been jeopardized, as would the seal integrity. As a practical matter, however, what the designer would likely do would be not to change the bolt 14 at all, but simply to take the size and tolerance range of the pre existing rounded corner 30 as a given. Then, all that would be needed would be to drill the bolt hole 16' enough smaller so as to assure the radial overlap with the bolt hole edge 22'. Bolt 14 need not be specially made, if the bolt hole 16' is just drilled to accommodate it. Now, as disclosed, bolt pad 24' is shown as axially thicker than bolt pad 24, but that is merely to accommodate the missing thickness of the eliminated washer 32. The sealing surface 20' could just be bored less deeply in order to make up for the missing thickness of washer 32. Therefore, the existing bolts 14 could clearly be used, just in a new way, to eliminate the washer 32. A number of other advantages are obtained in addition to the obvious cost savings of eliminating the washer 32. A less torque sensitive bolt tightening procedure and an improved and repeatable seal are obtained, simply by drilling the bolt hole 16' within a tolerance range that assures radial overlap with the bolt rounded corner 30'.

I claim:

1. In an air conditioning compressor housing having a gas pressurized interior and comprised of multiple parts retained together by at least one elongated bolt of harder material than said housing and having a cylindrical body running through a co axial cylindrical bolt hole in said parts, and in which a flat undersurface of a head of said bolt abuts a flat sealing surface on one of said parts, and in which said sealing surface surrounds a sharp circular edge of said bolt hole opening through said sealing surface, a method for assuring a gas tight seal between said bolt head undersurface and said sealing surface, comprising the steps of, determining the maximum radius of said circular bolt hole edge, determining the minimum radius of said cylindrical bolt body, providing said bolt head with a rounded corner transition between said bolt cylindrical body and said bolt head flat undersurface that merges into said bolt head undersurface at an imaginary circle that is radially outboard of said maximum bolt hole edge radius, thereby assuring radial overlap between said radiused corner transition and said sharp bolt hole edge, and, tightening said bolt head undersurface against said sealing surface, thereby directly deforming the softer material of said bolt hole edge axially and radially inwardly only with said bolt head rounded corner and assuring continuous, intimate, sealing contact between said bolt head rounded corner and said sealing surface surrounding said bolt hole.

2. In an air conditioning compressor housing having a gas pressurized interior and comprised of multiple parts retained together by at least one elongated bolt of harder material than said housing and having a cylindrical body, a bolt head with a flat undersurface, and a rounded corner of predetermined size and location joining said flat undersurface to said cylindrical bolt body, a method for assuring a gas tight seal around said bolt head undersurface and said sealing surface, comprising the steps of, machining a bolt hole through said canister housing having a sharp circular edge opening surrounded by a flat sealing surface in which the radius of said sharp circular edge is held within tolerances that assure a radial overlap between said sharp circular edge and said bolt head rounded corner as well as a radial clearance between said bolt body and bolt hole, and, inserting said bolt into said bolt hole and tightening said bolt head undersurface against said sealing surface, thereby directly deforming the softer material of said bolt hole edge axially and radially inwardly only with said bolt head rounded corner and assuring continuous, intimate, sealing contact between said bolt head rounded corner and said sealing surface surrounding said bolt hole.

3. In an air conditioning compressor housing having a gas pressurized interior and comprised of multiple parts retained together by at least one elongated bolt of harder material than said housing and having a cylindrical body running through a co axial cylindrical bolt hole in said parts, and in which a flat undersurface of a head of said bolt abuts a flat sealing surface on one of said parts, and in which said sealing surface surrounds a sharp circular edge of said bolt hole opening through said sealing surface, a method for assuring a gas tight seal between said bolt head undersurface and said sealing surface, comprising the steps of, determining the maximum radius of said circular bolt hole edge, determining the minimum radius of said cylindrical bolt body, providing said bolt head with a rounded corner transition between said bolt cylindrical body and said bolt head flat undersurface that merges into said bolt head undersurface at an imaginary circle that is radially outboard of said maximum bolt hole edge radius, thereby assuring radial overlap between said radiused corner transition and said sharp bolt hole edge, and, tightening said bolt head undersurface against said sealing surface to a pressure greater than the pressure necessary to maintain an adequate sealing pressure between said bolt head undersurface and said sealing surface, thereby directly deforming the softer material of said bolt hole edge axially and radially inwardly only with said bolt head rounded corner and assuring continuous, intimate, sealing contact between said bolt head rounded corner and said sealing surface surrounding said bolt hole and also assuring the attainment of a substantially ideal sealing pressure between said bolt head rounded corner and some portion of said sealing surface.

\* \* \* \* \*